United States Patent
Choi et al.

(10) Patent No.: US 11,515,928 B2
(45) Date of Patent: Nov. 29, 2022

(54) INTEGRATED BEAMFORMING METHOD WITH INTELLIGENT REFLECTING SURFACE ELEMENT ALLOCATION AND SYSTEM THEREFORE

(71) Applicant: Korea Advanced Institute of Science and Technology, Daejeon (KR)

(72) Inventors: Junil Choi, Daejeon (KR); Hyesang Cho, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 0 days.

(21) Appl. No.: 17/178,515

(22) Filed: Feb. 18, 2021

(65) Prior Publication Data

US 2022/0216908 A1 Jul. 7, 2022

(30) Foreign Application Priority Data

Dec. 28, 2020 (KR) .................. 10-2020-0184393

(51) Int. Cl.
  *H04B 7/06* (2006.01)
  *H04B 7/145* (2006.01)
  *H04B 7/0426* (2017.01)

(52) U.S. Cl.
  CPC ............ *H04B 7/145* (2013.01); *H04B 7/043* (2013.01); *H04B 7/0695* (2013.01)

(58) Field of Classification Search
  CPC ...... H04B 7/145; H04B 7/043; H04B 7/0695; H04B 7/0617
  See application file for complete search history.

(56) References Cited

U.S. PATENT DOCUMENTS

| | | | |
|---|---|---|---|
| 11,218,212 B1* | 1/2022 | Mun | H04W 72/048 |
| 2021/0288698 A1* | 9/2021 | Chen | H04B 7/145 |
| 2021/0337617 A1* | 10/2021 | Bao | H04W 76/18 |
| 2021/0384637 A1* | 12/2021 | Sciancalepore | H01Q 15/148 |
| 2021/0384958 A1* | 12/2021 | Denis | H01Q 15/002 |
| 2022/0014935 A1* | 1/2022 | Haija | H04W 16/28 |
| 2022/0021125 A1* | 1/2022 | Baligh | H01Q 19/10 |
| 2022/0052764 A1* | 2/2022 | Medra | H04L 27/38 |
| 2022/0060238 A1* | 2/2022 | Jassal | H04B 7/0695 |
| 2022/0077919 A1* | 3/2022 | Li | H04B 7/0617 |

OTHER PUBLICATIONS

Y. Yang, et al., "IRS-Enhanced OFDMA: Joint Resource Allocation and Passive Beamforming Optimization" IEEE Wireless Communications Letters, vol. 9, No. 6, Jun. 2020.
S. Abeywickrama, et al., "Intelligent Reflecting Surface: Practical Phase Shift Model and Beamforming Optimization", IEEE Transactions on Communications, vol. 68, No. 9, Sep. 2020.
Q. Nadeem, et al., "Intelligent Reflecting Surface-Assisted Multi-User MISO Communication: Channel Estimation and Beamforming Design," IEEE Open Journal of the Communications Society, vol. 1, pp. 661-680, May 2020.

* cited by examiner

*Primary Examiner* — Kenneth T Lam
(74) *Attorney, Agent, or Firm* — McCormick, Paulding & Huber PLLC

(57) ABSTRACT

An integrated beamforming method using intelligent reflecting surface (IRS) element allocation and a system thereof are disclosed. The integrated beamforming method includes allocating passive elements of an intelligent reflecting surface (IRS) to each of receivers, setting phase shifts of the IRS where the passive elements are allocated to each of the receivers, and performing transmit beamforming using the set phase shifts of the IRS.

6 Claims, 5 Drawing Sheets

INTEGRATED BEAMFORMING METHOD
WITH INTELLIGENT REFLECTING
SURFACE ELEMENT ALLOCATION AND
SYSTEM THEREFORE

CROSS-REFERENCE TO RELATED
APPLICATION

This application claims foreign priority benefits under 35 U.S.C. § 119 to Korean Patent Application No. 1020200184393 filed on Dec. 28, 2020, the content of which is hereby incorporated by reference in its entirety.

BACKGROUND

Embodiments of the inventive concept described herein relate to an integrated beamforming technology using intelligent reflecting surface (IRS) element allocation, and more particularly, relate to an integrated beamforming method for alternating phase shifts of an IRS and beamforming of a transmitter to maximize a minimum rate or a total rate.

It has become the era of extravagant data where demands for wireless communication systems naturally follow. Extensive research has been investigated through many attempts such as massive multiple-input multiple-output (MIMO) and millimeter wave communication. However, practical issues such as high power consumption and cost are still in demand.

To address such issues, recently, intelligent reflecting surface (IRS) has been a promising novel technology as a next generation wireless communication technology. The IRS is in the form of being equipped with a plurality of passive elements, each of which has the ability to independently shift the phase of impinging electromagnetic waves when reflected. The IRS may advantageously shift the wireless communication environment channel using such features. Furthermore, because of using passive elements without directly transmitting signals, the IRS has a great advantage in terms of power consumption and price. Such features have the possibility of going beyond the threshold of the existing technology.

The current situation of study on the IRS is in early stages. Research has been done for beamforming techniques for various goals. Herein, the ongoing beamforming research has a big limitation having high complexity to the point of being hard to be practically used. Most studies proceed with address issues using convex optimization techniques. This shows high performance, whereas this has high complexity proportional to the number of passive elements of the IRS. It is hard to use the IRS in reality because it is expected for the IRS to be installed in large units thanks to low power consumption or price.

SUMMARY

Embodiments of the inventive concept provide an integrated beamforming method for alternating phase shifts of an IRS and beamforming of a transmitter to maximize a minimum rate or a total rate and a system therefor.

According to an exemplary embodiment, an integrated beamforming method may include allocating passive elements of an intelligent reflecting surface (IRS) to each of receivers, setting phase shifts of the IRS, the passive elements of which are allocated to each of the receivers, and performing transmit beamforming using the set phase shifts of the IRS.

The integrated beamforming method may further include alternately repeating the allocating, the setting, and the performing to maximize a minimum rate or a total rate.

The setting may include setting the phase shifts of the IRS such that a channel from the IRS to each of the receivers performs constructive interference with a channel between a transmitter and each of the receivers.

The allocating may include allocating the passive elements to each of the receivers to maximize a minimum rate or a total rate.

The allocating may include allocating the passive elements to each of the receivers, such that a channel between a transmitter and the receivers and a beamformer gain are maximized.

The performing may include performing the transmit beamforming using an effective channel established by the set phase shifts of the IRS.

According to an exemplary embodiment, an integrated beamforming method may include allocating passive elements of an intelligent reflecting surface (IRS) to each of receivers to maximize a minimum rate or a total rate and performing transmit beamforming using the IRS, the passive elements of which are allocated to each of the receivers.

According to an exemplary embodiment, an integrated beamforming system may include an allocation unit that allocates passive elements of an intelligent reflecting surface (IRS) to each of receivers, a setting unit that sets phase shifts of the IRS, the passive elements of which are allocated to each of the receivers, and a beamforming unit that performs transmit beamforming using the set phase shifts of the IRS.

The operations of the allocation unit, the setting unit, and the beamforming unit may be alternately repeated to maximize a minimum rate or a total rate.

The setting unit may set the phase shifts of the IRS such that a channel from the IRS to each of the receivers performs constructive interference with a channel between a transmitter and each of the receivers.

The allocation unit may allocate the passive elements to each of the receivers to maximize a minimum rate or a total rate.

The allocation unit may allocate the passive elements to each of the receivers, such that a channel between a transmitter and the receivers and a beamformer gain are maximized.

The beamforming unit may perform the transmit beamforming using an effective channel established by the set phase shifts of the IRS.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Advantages, features, and methods of accomplishing the same will become apparent with reference to embodiments described in detail below together with the accompanying drawings. However, the inventive concept is not limited by embodiments disclosed hereinafter, and may be implemented in various forms. Rather, these embodiments are provided so that this disclosure will be through and complete and will fully convey the concept of the invention to those skilled in the art, and the inventive concept will only be defined by the scope of the appended claims.

Terms used in the specification are used to describe embodiments of the inventive concept and are not intended to limit the scope of the inventive concept. In the specification, the terms of a singular form may include plural forms unless otherwise specified. The expressions "comprise" and/or "comprising" used herein indicate existence of stated components, steps, operations, and/or elements, but do not exclude presence or addition of one or more other components, steps, operations, and/or elements.

Unless otherwise defined herein, all terms (including technical and scientific terms) used in the specification may have the same meaning that is generally understood by a person skilled in the art. Also, terms which are defined in a dictionary and commonly used should be interpreted as not in an idealized or overly formal detect unless expressly so defined.

Hereinafter, exemplary embodiments of the inventive concept will be described in detail with reference to the accompanying drawings. The same reference denotations are used for the same components on the drawings, and a duplicated description of the same components will be omitted.

Embodiments of the inventive concept is the gist of providing an integrated beamforming technology capable of alternating phase shifts of an intelligent reflecting surface (IRS) and beamforming of a transmitter to maximize a minimum rate or a total rate.

In this case, an embodiment of the inventive concept may allocate passive elements of an IRS to each of receivers and may set phase shifts of the IRS, the passive elements of which are allocated to each of the receivers.

Figure 1:
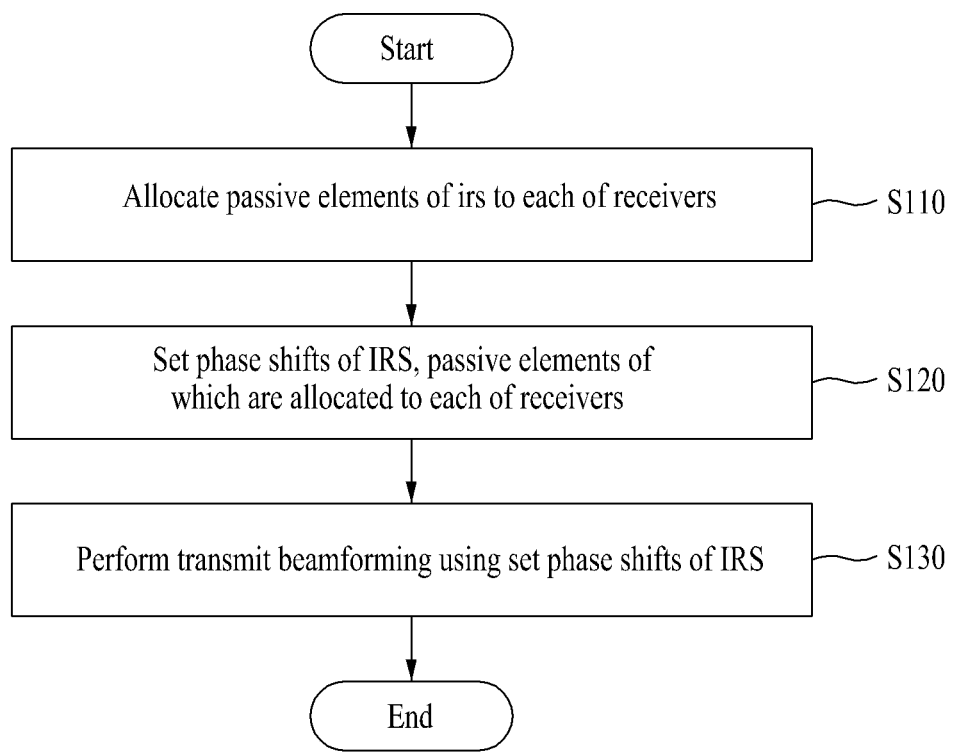
FIG. 1 is an operational flowchart illustrating an integrated beamforming method using intelligent reflecting surface (IRS) element allocation according to an embodiment of the inventive concept.

FIG. 1 is an operational flowchart illustrating an integrated beamforming method using IRS element allocation according to an embodiment of the inventive concept.

Referring to FIG. 1, in operation S110, the integrated beamforming method according to an embodiment of the inventive concept may be to allocate elements, for example, passive elements, of an IRS to each of receivers.

In this case, operation S110 may be to allocate the passive elements of the IRS to each of the receivers to maximize a minimum rate or a total rate.

In this case, in operation S110 may be to allocate the passive elements to each of the receivers, such that a channel between a transmitter and the receivers and a beamformer gain are maximized.

When the passive elements of the IRS are allocated to each of the receivers in operation S110, in operation S120, phase shifts of the IRS, the passive elements of which are allocated to each of the receivers, may be set or determined.

In this case, operation S120 may be to set the phase shifts of the IRS, such that a channel from the IRS to each of the receivers performs constructive interference with a channel between the transmitter and each of the receivers.

When the phase shifts of the IRS are set in operation S120, in operation S130, transmit beamforming may be performed using the set phase shifts of the IRS.

Herein, operation S130 may be to perform the transmit beamforming using an effective channel established by the set phase shifts of the IRS.

The method according to an embodiment of the inventive concept may alternately repeat operations S110 to S130 described above to maximize the minimum rate or the total rate. Of course, the number of times operations S110 to S130 are alternately repeated may be the number of times of maximizing the minimum rate or the total rate. The number of times may be determined by a provider or a person who provides the technology according to an embodiment of the inventive concept.

A description will be given in detail of the method according to an embodiment of the inventive concept with reference to FIGS. 2 to 4.

Figure 2:
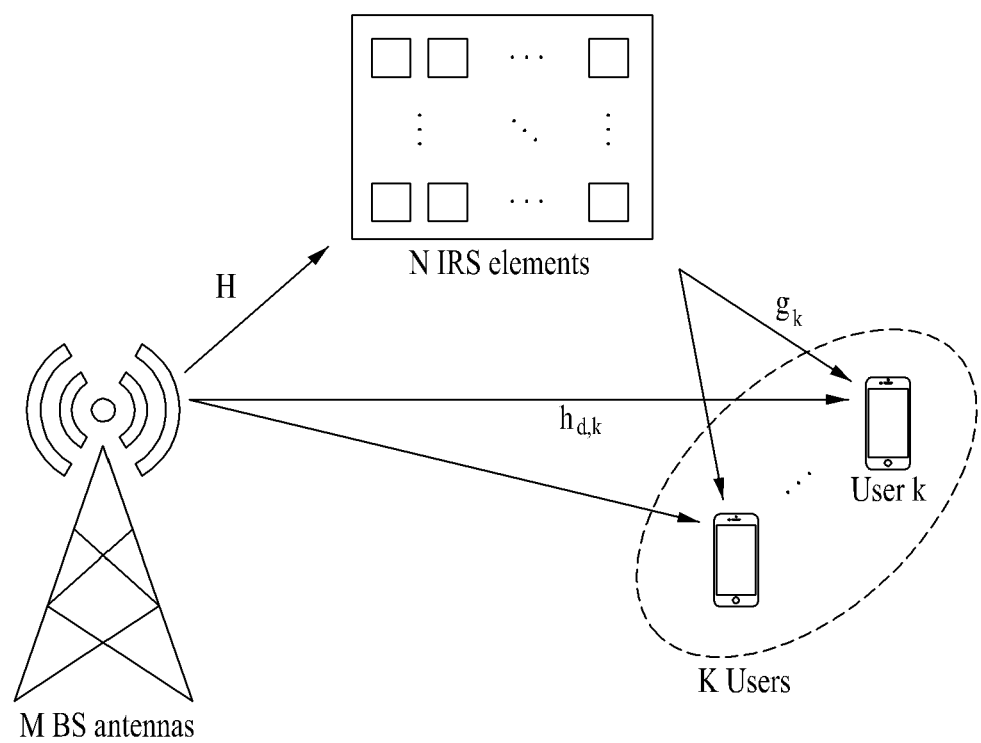
FIG. 2 is a drawing illustrating a system for describing a method according to an embodiment of the inventive concept.

FIG. 2 is a drawing illustrating a system for describing a method according to an embodiment of the inventive concept.

As shown in FIG. 2, the system according to an embodiment of the inventive concept is in a downlink situation where one transmitter with M antennas in a single cell environment supports K single antenna receivers and allows one IRS with N passive elements to aid the transmitter.

The method according to an embodiment of the inventive concept may provide an IRS element allocation technique of implementing performance close to a comparison group of high complexity using a technique of very low complexity compared to the existing technology and actively allocating passive elements of the IRS to receivers to accomplish purposes. There may be various IRS element allocation methods for purposes. However, an embodiment of the inventive concept may provide a technology of considering a situation of maximizing a minimum rate, for convenience of description, and alternating phase shifts of the IRS and beamforming of the transmitter to maximum the minimum rate for this purposes.

The signal received by the k-th receiver in the system environment shown in FIG. 1 may be denoted as Equation 1 below.

$$y_k = (H\Phi g_k + h_{d,k})^H \sum_{i=1}^{K} w_i s_i + z_k \qquad \text{[Equation 1]}$$

Herein, H may denote the channel between the transmitter and the IRS, $\Phi$ may denote the phase shifts of the IRS passive elements, $g_k$ may denote the channel between the IRS and the k-th receiver, $h_{d,k}$ may denote the channel between the transmitter and the k-th receiver, $w_i$ may denote the transmit beamformer for the i-th receiver, $s_i$ may denote the signal transmitted to the i-th receiver, and $z_k$ may denote the white Gaussian noise of the k-th receiver.

Furthermore, the phase shifts of the IRS may be represented as a formula below.

$$\Phi = \text{diag}(e^{j\theta_1}, \ldots, e^{j\theta_N})$$

Herein, $\theta_n$ may denote the phase shifts of the n-th element.

When calculating a signal-to-interference-and-noise ratio of each receiver based on Equation 1 above, the signal-to-interference-and-noise ratio may be represented as Equation 2 below.

$$\gamma_k = \frac{|(H\Phi g_k + h_{d,k})^H w_k|^2}{\sum_{l=k}^{K} |(H\Phi g_k + h_{d,k})^H w_l|^2 + \sigma^2 B}$$ [Equation 2]

Herein, $\gamma_k$ may denote the signal-to-interference-and-noise ratio of the k-th receiver, and $\sigma^2$ may denote the white Gaussian noise power density in the frequency band, and B may denote the use frequency band. Furthermore, the minimum rate $R_{min}$ using the signal-to-interference-and-noise ratio may be represented as Equation 3 below.

$$R_k = B\log(1 + \gamma_k),$$ [Equation 3]
$$R_{min} = \min_{k}(R_1, \ldots, R_K)$$

In the method according to an embodiment of the inventive concept, it is an objective to maximize a value of the minimum rate in Equation 3 above.

The method according to an embodiment of the inventive concept may be to allocate elements of a specific IRS to each receiver. For purposes, to this end, the method according to an embodiment of the inventive concept should determine whether to assign some elements to each receiver and whether to allocate any specific elements to the receiver.

Criteria may be set to suit purposes in the assignment of the elements. Because an embodiment of the inventive concept has purposes of maximizing the minimum rate, the poorer the state of each receiver, the more the elements may be allocated. The state of the receiver may be one of criteria capable of well representing the state of the channel, which is the channel between the transmitter and the receiver and the beamformer gain, that is, $|h_{d,k}{}^H w_k|$, and the assignment of the elements may be inversely proportional to the channel between the transmitter and the receiver and the beamformer gain. In this case, the assignment of the elements may be represented as Equation 4 below.

$$\alpha_k \frac{1}{|h_{d,k}^H w_k|}, \ell_k = N\frac{\alpha_k}{\sum_{i=1}^{K} \alpha_i}$$ [Equation 4]

Herein, $l_k$ may denote the number of the passive elements of the IRS assigned to the k-th receiver.

The allocation of the elements may also be to change criteria for purposes, and may be to first allocate elements, where the channel between the transmitter and the receiver through the IRS and the beamformer gain, that is, $|g_{n,k}*h_n{}^H w_k|$ are maximized, to the weak receiver to maximize the minimum rate, which may be represented as Equation 5 below.

$$n_0 = \operatorname*{argmax}_{n}|g_{n,k}^* h_n^H w_k|, n \in N_0$$ [Equation 5]
$$N_k = N_k + n_0, N_0 = N_0 - n_0$$

Herein, $N_k$ may denote the set of elements allocated to the k-th receiver, and $N_0$ may denote the set of elements which are not allocated. As a result, all elements may be allocated to one receiver.

After allocating the elements of the IRS to each of the receivers, the transmit beamformer and the phase shifts of the IRS may be determined to suit it.

First of all, when determining the transmit beamformer, while fixing the phase shifts of the IRS, it may be seen that the overall effective channel is the conventional downlink channel which does not consider the IRS. Thus, the transmit beamformer may be a beamformer, such as the zeroforcing (ZF) beamformer or the regularized zeroforcing (RZF) beamformer, which is already well known. As a result, the transmit beamformer may be correctly set in the channel where the transmit beamforming is not performed to increase rates of the receivers.

Thereafter, the phase shifts of the IRS should be determined, which is set such that the channel to each receiver through the IRS performs constructive interference with the channel between the transmitter and the receiver. In this case, the phase shifts of each element may be updated as Equation 6 below.

$$\angle\theta_n = -\angle(h_{d,k}{}^H w_k) - \angle g_{n,k} + \angle(h_n{}^H w_k), n \in N_k$$ [Equation 6]

The result like Equation 7 below may be made through the phase shifts in Equation 6 above.

$$\angle(h_{d,k}{}^H w_k) = \angle(g_{n,k}^* e^{j\theta_n} * h_n{}^H w_k)$$ [Equation 7]

Using Equation 7 above, the numerator of Equation 2 above may be represented as Equation 8 below.

$$\left| h_{d,k}^H w_k + \sum_{n=1}^{N} g_{n,k}^* e^{j\theta_n^*} h_n^H w_k \right|^2$$ [Equation 8]

It may be seen that the numerator of $\gamma$k increases as the constructive interference occurs in the channel through the IRS and the channel between the transmitter and the receiver due to Equation 7 above. Thus, by adjusting the phase shifts of the IRS, signal-to-interference-and-noise ratios of all of receivers may increase.

In this case, it may be seen in Equation 6 above that the method according to an embodiment of the inventive concept considers only one receiver when adjusting each element through element allocation of the IRS, when adjusting the phase shifts of the IRS. The existing technology allows most elements to consider all receivers and uses convex optimization techniques of high complexity to address it, whereas the method according to an embodiment of the inventive concept considers one receiver per element to vastly decrease the complexity.

Such a method according to an embodiment of the inventive concept may provide an alternating beamforming technique of alternately repeating the above-mentioned IRS element allocation, the transmit beamforming, and the adjustment of the phase shifts of the IRS to maximize the minimum rate. Such an alternating beamforming technique may be represented as Table 1 below. Herein, the transmit beamformer may have advantage capable of changing per iteration to be flexible in responding if necessary.

TABLE 1

Algorithm 1 Pseudo-code for IRS allocation and alternating beamforming

1: Initialization: Random $\Phi$, W, $\mathcal{N}_0 = \{1, 2, \ldots, N\}$, $\mathcal{N}_k = \emptyset$, $1 \leq k \leq K$ TABLE 1-continued Algorithm 1 Pseudo-code for IRS allocation and alternating beamforming 2: repeat 3:     With $\alpha_k = \frac{1}{|h_{d,k}^H w_k|}$, set $l_k = \left\lfloor N \frac{\alpha_k}{\sum_{i=1}^{K} \alpha_i} \right\rfloor$ with remainders as (6)

4:     Order UEs as $\alpha_{m_1} \geq \alpha_{m_2} \geq \ldots \geq \alpha_{m_K}$
5:     for i = 1 to K do
6:        repeat
7:           $n_0 = \mathrm{argmax}_n |g_{n,m_i}^* h_n^H w_{m_i}|, n \in \mathcal{N}_0$
8:           $\mathcal{N}_{m_i} = \mathcal{N}_{m_i} + \{n_0\}, \mathcal{N}_0 = \mathcal{N}_0 - \{n_0\}$
9:        until Iteration is repeated $l_{m_i}$ number of times
10:    for k = 1 to K do
11:       repeat
12:          $\angle \theta_{n_k} = -\angle(h_{d,k}^H w_k) - \angle g_{n_k,k} + \angle(h_{n_k}^H w_k)$,
13:          $\mathcal{N}_k = \mathcal{N}_k - \{n_k\}, \mathcal{N}_0 = \mathcal{N}_0 + \{n_k\}$ 14:    until $\mathcal{N}_k = \emptyset$ 15:    Update transmit beamformer W using effective channel formed by $\Phi$
16: until Iteration is repeated V > 0 number of times In Table 1 above, V denotes the number of iterations for the IRS element allocation, the transmit beamforming, and the IRS phase shifts. In this case, the method according to an embodiment of the inventive concept may have complexity of $\mathcal{O}((V+q)M^3K)$, when the number of elements of the IRS is less than a predetermined number, and may have complexity of $\mathcal{O}(V(M+1)N(N+1))$, when the number of elements of the IRS is greater than the predetermined number. Herein, q may denote the number of beamformer setting iterations when the final transmit beamformer is used as the optimal minimum rate maximizing beamformer. The comparison group using the convex optimization techniques may have high complexity of $\mathcal{O}(VN^{4.5})$. As a result, it may be seen that the method according to an embodiment of the inventive concept has extremely low complexity.

To verify performance of the method according to an embodiment of the inventive concept, the simulation may be performed using the Monte-Carlo technique. There may be three of the situation where the convex optimization techniques are used, the situation where there is no IRS, and the situation where the phase shifts of the IRS are randomly set as comparison groups. These may be represented as [14] (Q. Nadeem, H. Alwazani, A. Kammoun, A. Chaaban, M. Debbah, and M. Alouini, "Intelligent Reflecting Surface-Assisted Multi-User MISO Communication: Channel Estimation and Beamforming Design," IEEE Open Journal of the Communications Society, vol. 1, pp. 661-680, May 2020), No-IRS, and Random, respectively. Furthermore, the method according to an embodiment of the inventive concept may set the transmit beamformers to the RZF, the ZF, and the maximal ratio transmission (MRT), respectively, and may use the optimal minimum rate maximizing beamformer when adjusting the final transmit beamformer for all situations.

Figure 3:
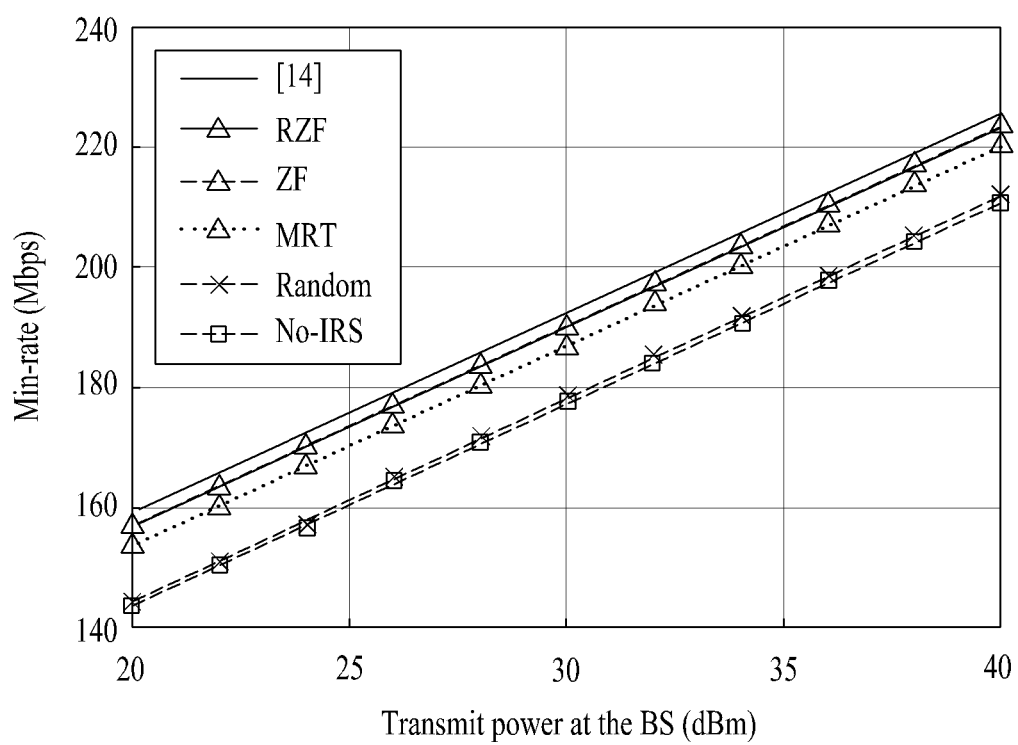
FIG. 3 is a drawing illustrating a minimum rate according to a transmit power of a transmitter.

FIG. 3 is a drawing illustrating a minimum rate according to a transmit power of a transmitter, which is a drawing illustrating a minimum rate according to a transmit power of [14], No-IRS, Random, RZF, ZF, or MRT when M=8, N=100, and K=4.

As seen with reference to FIG. 3, it may be seen that the method (RZF, ZF, or MRT) according to an embodiment of the inventive concept makes performance very similar to [14] and has higher performance than No-IRS and Random.

Figure 4:
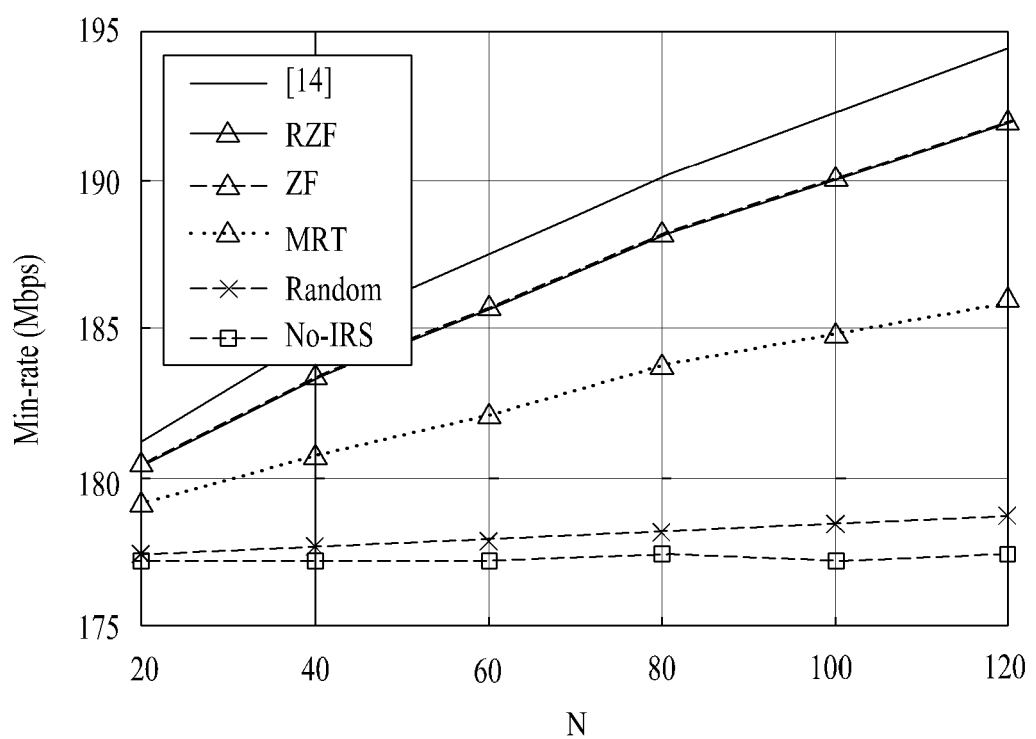
FIG. 4 is a drawing illustrating a minimum rate according to the number of elements of an IRS.

FIG. 4 is a drawing illustrating a minimum rate according to the number of elements of an IRS, which is a drawing illustrating a minimum rate according to the number of elements of the IRS of [14], No-IRS, Random, RZF, ZF, or MRT when M=8, P=30 dBm, and K=4.

As seen with reference to FIG. 4, as the performance increases depending on the number N of the elements, it may be seen that the elements of the IRS are correctly used. As the method according to an embodiment of the inventive concept considers only one receiver per element when adjusting the IRS phase shifts to reduce complexity, it may be seen that the performance difference with [14] increases as the number of the elements of the IRS increases because inevitable damage occurs due to this. However, it is impossible to substantially use [14] using the technique of very high complexity, and the number of IRSs may not be implemented as only 120 IRSs due to high complexity in the simulation implementation. On the other hand, the method according to an embodiment of the inventive concept may accomplish performance similar to high complexity using low complexity. Of course, the method according to an embodiment of the inventive concept is not limited or restricted to consider only one receiver per element. The method according to an embodiment of the inventive concept may consider two or more receivers per element and may consider two or more elements per receiver.

As such, the method according to an embodiment of the inventive concept may alternate the phase shifts of the IRS and beamforming of the transmitter to maximize the minimum rate.

Furthermore, the method according to an embodiment of the inventive concept may consider the technology called the IRS in multiple user downlink environments in the wireless communication system and may accomplish high performance very similar to high complexity using very low complexity through the IRS element allocation.

Furthermore, the method according to an embodiment of the inventive concept may set and use only criteria for various purposes such as minimum rate maximization and total rate maximization in the downlink environment supporting multiple users in the wireless communication system.

Furthermore, the method according to an embodiment of the inventive concept may be applied to all wireless communication systems to which the IRS is applied, because it is possible to operate using low complexity.

Figure 5:
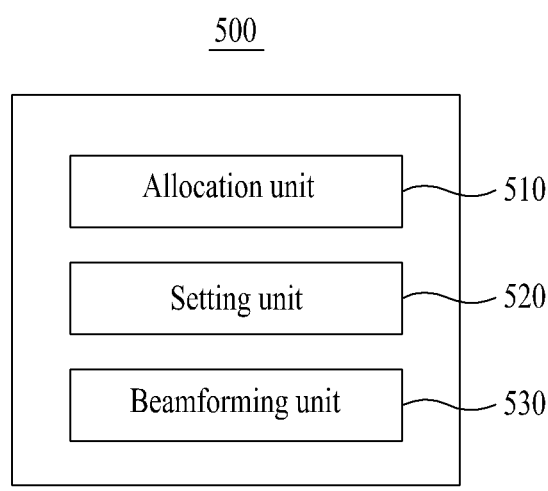
FIG. 5 is a block diagram illustrating a configuration of an integrated beamforming system using IRS element allocation according to an embodiment of the inventive concept.

FIG. 5 is a block diagram illustrating a configuration of an integrated beamforming system using IRS element allocation according to an embodiment of the inventive concept, which illustrates a conceptual configuration of a system which performs the method of FIGS. 1 to 4.

Referring to FIG. 5, a system 500 according to an embodiment of the inventive concept may include an allocation unit 510, a setting unit 520, and a beamforming unit 530.

The allocation unit 510 may allocate elements, for example, passive elements, of the IRS to each of receivers.

In this case, the allocation unit 510 may allocate the passive elements of the IRS to each of the receivers to maximize a minimum rate or a total rate.

In this case, the allocation unit 510 may allocate the passive elements to each of the receivers such that a channel between a transmitter and the receivers and a beamformer gain are maximized.

The setting unit 520 may set or determine phase shifts of the IRS, the passive elements of which are allocated to each of the receivers.

In this case, the setting unit 520 may set the phase shifts of the IRS, such that a channel from the IRS to each of the receivers performs constructive interference with a channel between the transmitter and each of the receivers.

The beamforming unit 530 may perform transmit beamforming using the set phase shifts of the IRS.

Herein, the beamforming unit 530 may perform the transmit beamforming using an effective channel established by the set phase shifts of the IRS.

The system 500 according to an embodiment of the inventive concept may alternately repeat the operations of the allocation unit 510, the setting unit 520, and the beamforming unit 530 to maximize the minimum rate or the total rate. Of course, the number of times the operations of the allocation unit 510, the setting unit 520, and the beamforming unit 530 are alternately repeated may be the number of times of maximizing the minimum rate or the total rate. The number of times may be determined by a provider or a person who provides the technology according to an embodiment of the inventive concept.

It is apparent to those skilled in the art that, although the description is omitted in the system according to an embodiment of the inventive concept shown in FIG. 5, the respective means constituting FIG. 5 may include all details described in FIGS. 1 to 4.

The foregoing devices may be realized by hardware elements, software elements and/or combinations thereof. For example, the devices and components illustrated in the exemplary embodiments of the inventive concept may be implemented in one or more general-use computers or special-purpose computers, such as a processor, a controller, an arithmetic logic unit (ALU), a digital signal processor, a microcomputer, a field programmable array (FPA), a programmable logic unit (PLU), a microprocessor or any device which may execute instructions and respond. A processing unit may implement an operating system (OS) or one or software applications running on the OS. Further, the processing unit may access, store, manipulate, process and generate data in response to execution of software. It will be understood by those skilled in the art that although a single processing unit may be illustrated for convenience of understanding, the processing unit may include a plurality of processing elements and/or a plurality of types of processing elements. For example, the processing unit may include a plurality of processors or one processor and one controller. Also, the processing unit may have a different processing configuration, such as a parallel processor.

Software may include computer programs, codes, instructions or one or more combinations thereof and may configure a processing unit to operate in a desired manner or may independently or collectively control the processing unit. Software and/or data may be embodied in any type of machine, components, physical equipment, virtual equipment, or computer storage media or devices so as to be interpreted by the processing unit or to provide instructions or data to the processing unit. Software may be dispersed throughout computer systems connected via networks and may be stored or executed in a dispersion manner. Software and data may be recorded in one or more computer-readable storage media.

The methods according to the above-described exemplary embodiments of the inventive concept may be implemented with program instructions which may be executed through various computer means and may be recorded in computer-readable media. The computer-readable media may also include, alone or in combination with the program instructions, data files, data structures, and the like. The program instructions recorded in the media may be designed and configured specially for the exemplary embodiments of the inventive concept or be known and available to those skilled in computer software. Examples of computer-readable media include magnetic media such as hard disks, floppy disks, and magnetic tape; optical media such as compact disc-read only memory (CD-ROM) disks and digital versatile discs (DVDs); magneto-optical media such as floptical disks; and hardware devices that are specially configured to store and perform program instructions, such as read-only memory (ROM), random access memory (RAM), flash memory, and the like. Program instructions include both machine codes, such as produced by a compiler, and higher level codes that may be executed by the computer using an interpreter.

According to embodiments of the inventive concept, the integrated beamforming system may alternate the phase shifts of the IRS and beamforming of the transmitter to maximize the minimum rate or the total rate.

According to embodiments of the inventive concept, the integrated beamforming system may consider the technology called the IRS in multiple user downlink environments in the wireless communication system and may accomplish high performance similar to high complexity using very low complexity through the IRS element allocation.

According to embodiments of the inventive concept, the integrated beamforming system may set and use only criteria for various purposes such as minimum rate maximization and total rate maximization in the downlink environment supporting multiple users in the wireless communication system.

According to embodiments of the inventive concept, the integrated beamforming system may be applied to all wireless communication systems to which the IRS is applied, because it is possible to operate with low complexity.

While a few exemplary embodiments have been shown and described with reference to the accompanying drawings, it will be apparent to those skilled in the art that various modifications and variations can be made from the foregoing descriptions. For example, adequate effects may be achieved even if the foregoing processes and methods are carried out in different order than described above, and/or the aforementioned elements, such as systems, structures, devices, or circuits, are combined or coupled in different forms and modes than as described above or be substituted or switched with other components or equivalents.

Therefore, other implements, other embodiments, and equivalents to claims are within the scope of the following claims.

What is claimed is:

1. An integrated beamforming method, comprising:
allocating passive elements of an intelligent reflecting surface (IRS) to each of receivers;
setting phase shifts of the IRS, the passive elements of which are allocated to each of the receivers; and
performing transmit beamforming using the set phase shifts of the IRS, wherein the [[the]] phase shifts are updated as Equation below;

$$\angle \theta_n = -\angle(h_{d,k}^H w_k) - \angle g_{n,k} + \angle(h_n^H w_k), n \in N_k$$

$\theta_n$ denotes the phase shifts of the n-th element, $h_{d,k}$ denotes a channel between a transmitter and a k-th receiver, $w_k$ may denote a transmit beamformer for the k-th receiver, $g_{n,k}$ denotes a channel between the n-th element and the k-th receiver.

2. The integrated beamforming method of claim 1, further comprising:

alternately repeating the allocating, the setting, and the performing to maximize a minimum rate or a total rate.

3. The integrated beamforming method of claim 1, wherein the setting includes:

setting the phase shifts of the IRS such that a channel from the IRS to each of the receivers performs constructive interference with a channel between a transmitter and each of the receivers.

4. The integrated beamforming method of claim 1, wherein the allocating includes:

allocating the passive elements to each of the receivers to maximize a minimum rate or a total rate.

5. The integrated beamforming method of claim 1, wherein the allocating includes:

allocating the passive elements to each of the receivers, such that a channel between a transmitter and the receivers and a beamformer gain are maximized.

6. The integrated beamforming method of claim 1, wherein the performing includes:

performing the transmit beamforming using an effective channel established by the set phase shifts of the IRS.

* * * * *